(12) United States Patent
Clark et al.

(10) Patent No.: US 6,570,819 B1
(45) Date of Patent: May 27, 2003

(54) LOW FREQUENCY ACOUSTIC PROJECTOR

(75) Inventors: Joseph A. Clark, Arlington, VA (US); Jane Ann Young, Rockville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/092,689

(22) Filed: Mar. 8, 2002

(51) Int. Cl.⁷ .............................. G01V 1/04; H04R 1/00
(52) U.S. Cl. ........................ 367/142; 181/113; 181/120
(58) Field of Search .................. 181/113, 120; 310/337; 367/3, 5, 153, 154, 141, 142

(56) References Cited

U.S. PATENT DOCUMENTS

| | | | |
|---|---|---|---|
| 3,946,831 A | * | 3/1976 | Bouyoucos ................. 181/120 |
| 3,964,013 A | * | 6/1976 | Konrad ........................ 367/137 |
| 4,189,026 A | | 2/1980 | Elliot et al. |
| 4,651,044 A | | 3/1987 | Kompanek |
| 4,713,800 A | | 12/1987 | Russell |
| 4,733,379 A | | 3/1988 | Lapetina et al. |
| 5,105,801 A | | 4/1992 | Cathignol et al. |
| 5,126,979 A | | 6/1992 | Rowe, Jr. et al. |
| 5,146,435 A | | 9/1992 | Bernstein |
| 5,152,480 A | | 10/1992 | Adams et al. |
| 5,195,508 A | | 3/1993 | Muller et al. |
| 5,214,620 A | | 5/1993 | Rattner |
| 5,229,977 A | | 7/1993 | Owen |
| 5,268,879 A | | 12/1993 | Flanagan |
| 5,782,435 A | | 7/1998 | Ingram et al. |
| 5,886,661 A | | 3/1999 | Harrison et al. |
| 6,075,753 A | | 6/2000 | Clark et al. |

OTHER PUBLICATIONS von W. Eisenmenger, Elektromagnetische Erzeugung von Ebenen Druckstossen in Flussigkeiten, Akustische Beihefte, Heft 1, 1962.
J.A. Clark, "Spalling in Liquids", Physics Letters, vol. 83a, No. 3, pp. 139–141, May 1981.
F.J. Sazama and J.B. Whitt, "EDESS: An Electromagnetically–Driven Explosive–Shock Simulator", Paper presented at the 51st Shock & Vibration Symposium, Oct. 20–24, 1980, San Diego and at 2nd Electromagnetic Guns & Launchers Conf., Nov. 4–6, 1980, San Diego, CA, pp. 137–147.

* cited by examiner

*Primary Examiner*—Ian J. Lobo
(74) *Attorney, Agent, or Firm*—Steven W. Crabb

(57) ABSTRACT

A reusable low frequency projector system that is capable of producing coherent broadband, high power, low frequency acoustic pressure waves underwater. The projector has two halves each with a spiral wound insulated wire core. The spiral wound wires are separately encapsulated and then joined flexibly in a contiguous parallel orientation. When energized by a voltage source the encapsulated spiral wound wires are repelled from one another and then come back together when not energized, imparting a pressure wave to the water at a desired frequency. The projector requires no pressure compensation devices for operation.

12 Claims, 3 Drawing Sheets

LOW FREQUENCY ACOUSTIC PROJECTOR

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

This invention relates to acoustic projectors, and more particularly to underwater, small, low weight, depth independent, coreless electromagnetic acoustic projector systems capable of producing coherent broadband high power low frequency acoustic pressure waves in fluids.

A transducer is a device that converts energy from one form to another. Underwater acoustic transducers generally take acoustic wave inputs from the water and convert the wave to an electrical output signal, known as hydrophones, or take an electrical signal input and produce an acoustic wave output, known as projectors. Both hydrophones and projectors are widely used in sonar systems used for submarine and surface ship applications. Projectors are generally well known and take many forms, including mechanical, chemical and electrical. Acoustic projection systems operating at or below 1 kHz have low propagation loss and thus are an area of study for long-range sonar for both military and oceanographic applications. Size and weight are two of the biggest challenges faced when designing high power (on the order of 209 dB re 1 $\mu$Pa at 1 m), low frequency projectors. Some additional concerns are environmental impacts and cost.

One method commonly used to generate high power, low frequency acoustic waves is to detonate an explosive charge such as TNT or HBX material. However, explosive charges produce unwanted extraneous effects such as light flashes or bubbles and the sound is incoherent and not able to be precisely reproduced. Additionally, explosives are extremely hazardous to handle and may also leave chemicals in the water from incomplete combustion, which can adversely impact the environment. Also, these systems are good for one time only and become expensive if a large series of acoustic wave outputs are desired.

One system capable of generating frequencies on the order of 10 Hz, which is in the frequency range of interest, is disclosed in U.S. Pat. No. 4,189,026, wherein igniting a combustible gas mixture produces the acoustic wave. However, this device requires fuel and air to be supplied either from the surface or from tanks in order to achieve combustion. Another gas combustion device disclosed in U.S. Pat. No. 5,229,977, obviates the need for a surface supply or tanks by relying on electrolysis of water to produce the needed gas combustion mixture. These devices introduce undesirable extraneous effects such as heat, light and bubbles into the water and are not precisely repeatable.

Another class of projectors that overcome some of these undesirable effects utilizes electromechanical drivers. One such device is depicted in U.S. Pat. No. 5,268,879. This device uses electromagnet assemblies that include a magnetically permeable core and solenoids. However, core saturation places limits on the output power that is obtainable from these types of projectors. This can be overcome by increasing the size of the core to obtain the necessary output, but the size and weight can become unwieldy quickly.

Piezoelectric materials offer some advantages for sonar use. However, these ceramic materials are fragile and expensive. Additionally, performance of a sonar transducer made of piezoelectric material is limited by the inherent energy density of the driver material and its efficiency, especially for applications with size restrictions that require very high source levels and/or very low frequencies. Source level is also limited by the material volume change limitations that are characteristically small with piezoelectric. These materials have been optimized over the years and no further large improvements are expected. It is expected that further improvements must come from new transducer types or from improved materials.

Accordingly, there is a need for a reusable, rugged, small size, high power, low frequency projector system that is capable of producing coherent broadband, high power, low frequency acoustic waves.

SUMMARY OF THE INVENTION

An underwater low frequency acoustic projector system comprises two spiral wound wires that are flexibly joined to permit movement. In accordance with one aspect of the present invention the wires are insulated and when energized the coiled wires are repelled from each other.

In accordance with another aspect of the invention the spiral wound wires are separately encapsulated and then joined flexibly in a parallel orientation contiguous with one another. When energized the encapsulated spiral wound wires are repelled from one another and then come back together when not energized. This imparts a pressure wave to the water.

In accordance with still another aspect of the invention the spiral wound wire pairs may be formed into an array that may be used in conjunction with electronic beam forming systems to increase directivity and directional power output.

Still other aspects of the present invention will become apparent to those skilled in the art from the following detailed description of the preferred embodiment. It is possible to modify the invention in obvious respects without departing from the invention. Accordingly, the drawings and description are to be regarded as illustrative in nature, and not as restrictive.

DESCRIPTION OF THE PREFERRED EMBODIMENTS

Figure 1:
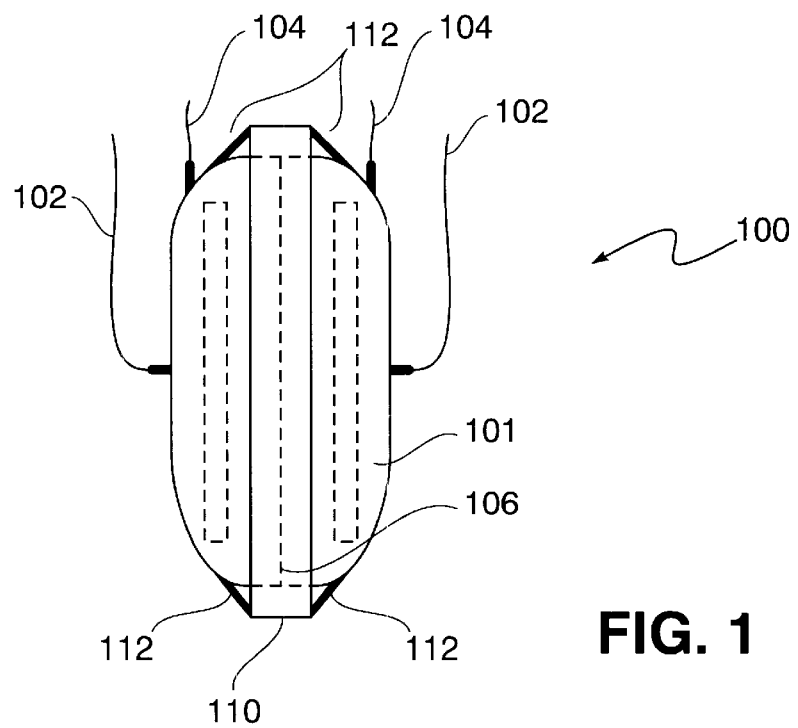
FIG. 1 is a side view of the projector of the present invention.

Referring more particularly to the drawings, FIG. 1 is a side view of a low frequency projector in accordance with the present invention. The low frequency projector 100 depicted consists of two spiral wound wires that are separately encapsulated for stability and protection and contiguous with each other 106. In the preferred embodiment each spiral is constructed of 19 AWG insulated wires wound flat with approximately 1200 turns and having a diameter of approximately 4.5 inches. Preferably the spiral wound wires are spaced approximately 1/8 inch or less apart. By altering the size of the wires and the number of turns it is possible to produce a projector with other desired efficiencies and power ratings. Each of the spiral wound wires are preferably encapsulated in a fiberglass resin such as Evercoat 499, made by Fibre Glass-Evercoat Co., Inc. of Cincinnati, Ohio. These encapsulated spiral wound wires 101 meet each other at a parallel interface, or seam 106. An annular ring of epoxy 110 such as Devcon made by ITW Brands, Inc. of Wood Dale, Ill., surrounds the interface 106 between the two encapsulated spiral wound wires 101. The epoxy ring 110 is attached to each of the encapsulated wires 101 by flexible bands 112 preferably made of rubber such as commonly available silicon or urethane rubbers. These flexible bands 112 together with the pressure of the water exert force on the coils 101 so as to maintain the contiguous relationship between the coils 101 when not energized. It would also be possible to flexibly join the two spiral wires 101 directly to each other. Each of the encapsulated wires 101 has a first lead 102 and a second lead 104 that protrude out of the encapsulated wires to provide paths for input and output signals to each side of the projector.

Figure 2:
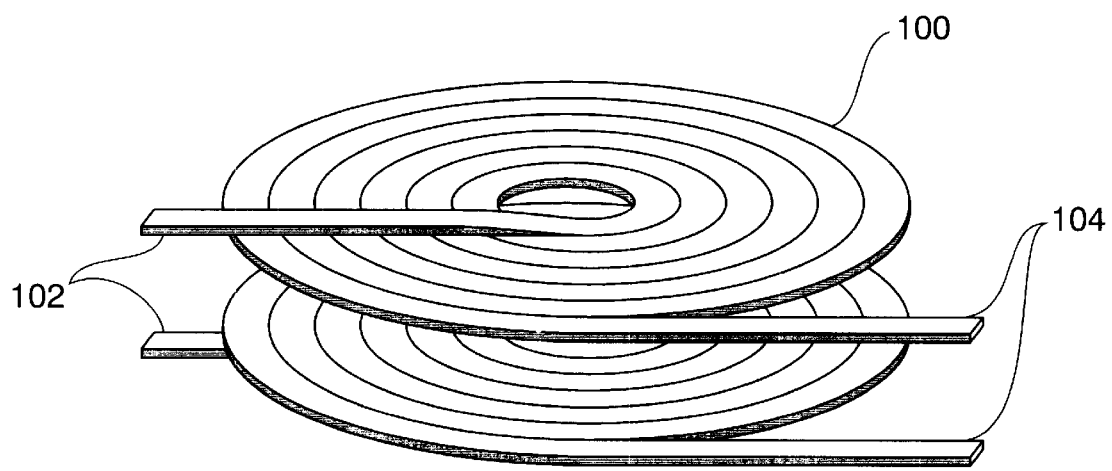
FIG. 2 is a perspective view depicting the spiral wound coils of the present invention.

FIG. 2 depicts the spiral wound wires without the encapsulating shell. The wires are insulated and wound in a tight spiral fashion with a first lead 102 and a second lead 104 used for applying an electrical signal. Though the wires shown are depicted as rectangular this is only for illustration purposes and it should be recognized that round, twisted or other types of wire might be used. The elimination of electromagnetic cores that are commonly used in projectors facilitates a smaller and lighter design than previously known.

Figure 3:
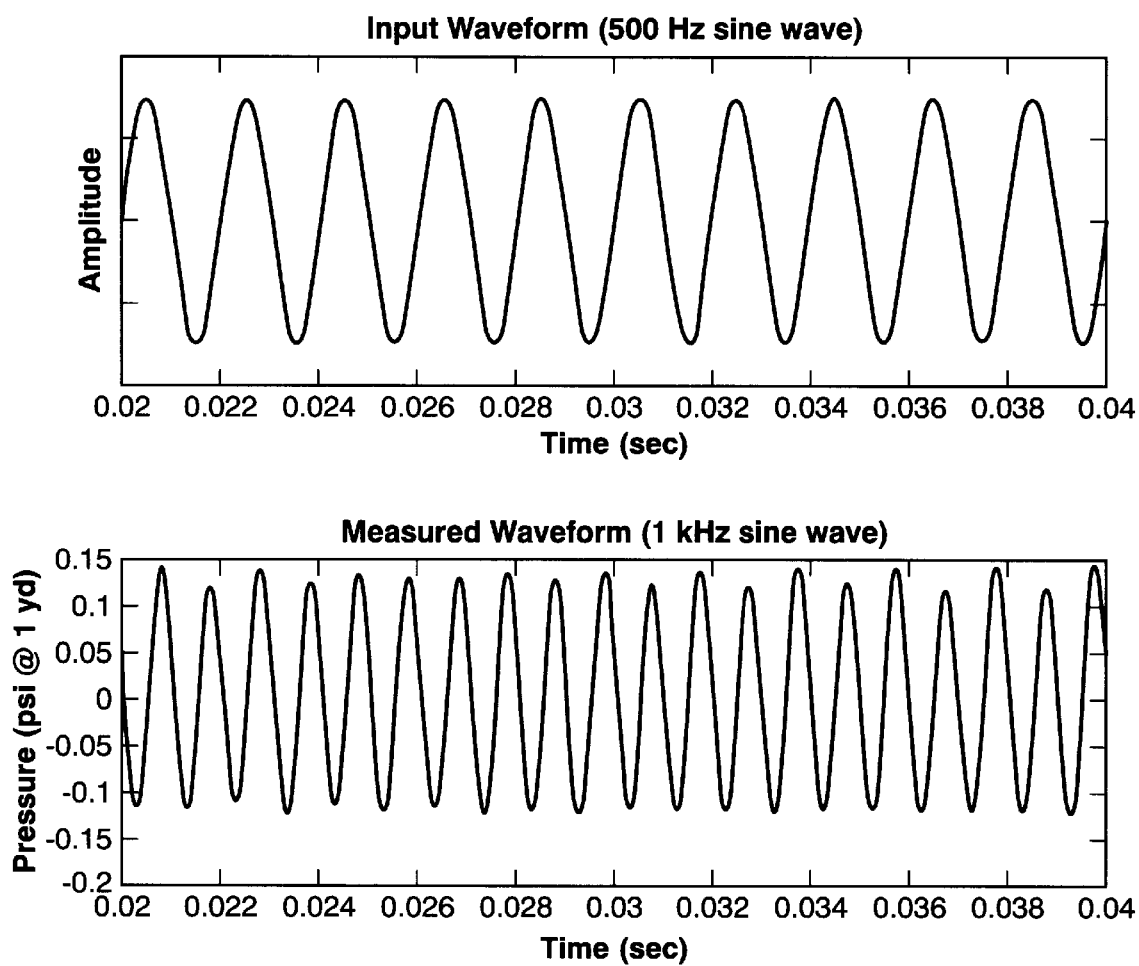
FIG. 3 is a graphical example of a 500 Hz input sine wave and the corresponding 1 kHz tone output at a source level of 180 dB re 1 $\mu$Pa, produced in accordance with the present invention.

FIG. 3 graphically illustrates the characteristic frequency doubling of the projector during steady state operation, one graph shows the 500 Hz input waveform and the other graph shows the measured lkHz tone out at a source level of 180 dB re 1 $\mu$Pa using 30 kW power input. When a voltage is applied across the coil leads in a manner such that current passes through each coil in opposing directions, opposing magnetic forces are created. The coils are thus repelled from each other when current flows. When the coils are energized the encapsulated spiral wound wires are repelled from one another and move apart and then come back together when the coils are not energized, thereby imparting a pressure wave to the water. During steady state operation, when the projector is supplied with a sinusoidal voltage at a given input frequency the resultant output is twice the given input frequency. This frequency doubling is due to the fact that the two coils are repelled during both the negative and positive cycles of the sine wave input. The silicon rubber bands connected to each coil and the annular epoxy ring, in conjunction with static pressure of the water provide a restorative force when no current is flowing in the coils.

Figure 4:
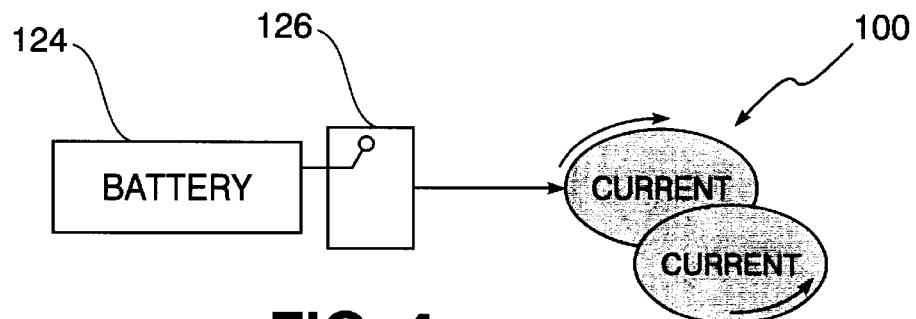
FIG. 4 is a block diagram representation of the basic components to send transient pulses from the projector in a device such as a sonobuoy.

One embodiment of the present invention is suitable for use in a sonobuoy application. A sonobuoy housing (not shown) would hold the projector 100 a power source and any necessary switching circuits as well as any ballast deemed necessary. FIG. 4 illustrates the basic components required for sonobuoy use. A battery 124 supplies electrical power for the projector 100, and switching circuits 126 control the electricity flow to the projector. This embodiment requires no special pressure compensation device, and is light enough and small enough to fit inside sonobuoys.

Figure 5:
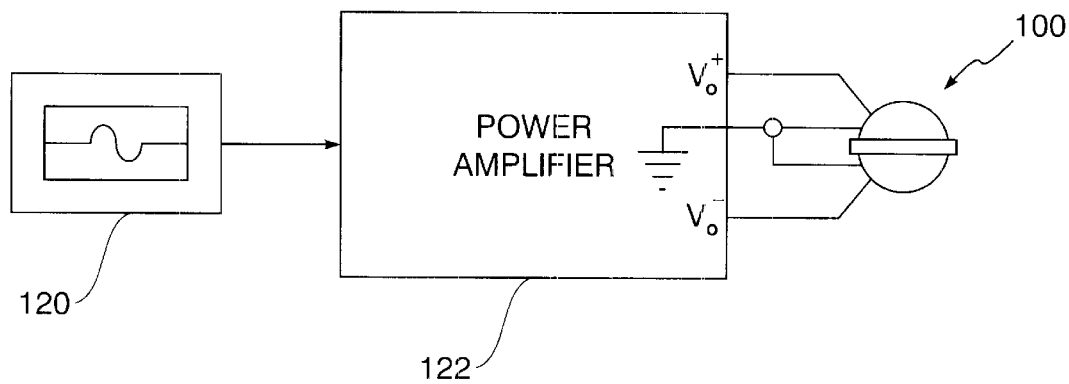
FIG. 5 is a block diagram representing the basic components of a projector system to provide various signal inputs.

Another embodiment that is suitable for a variety of uses from the laboratory to the field is illustrated in FIG. 5. The electrical power transmitted to the projector originates from a signal generator 120 having a frequency range of interest, such as 10 Hz to 1 kHz. The signal may be either steady state or impulse. A power amplifier 122 amplifies and transmits the input signal to the projector 100. The projector will output an acoustic wave at twice the input frequency for a sinusoidal input.

Figure 6:
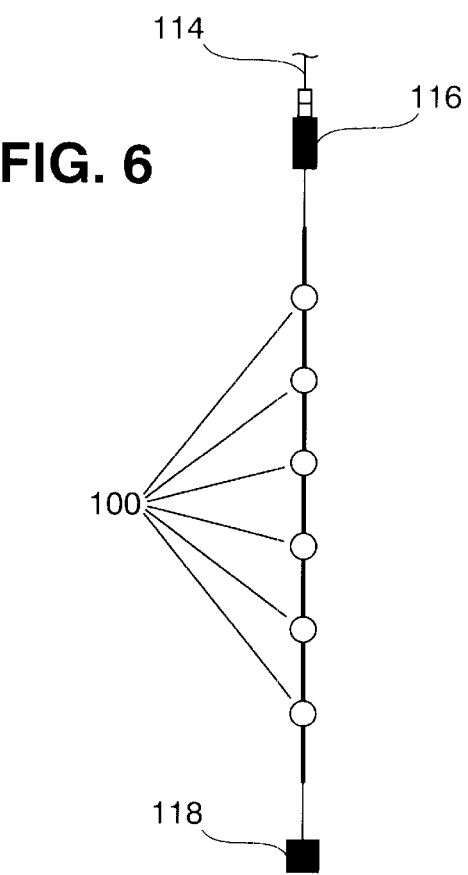
FIG. 6 is a diagram illustrating a line array.

It is also possible to incorporate the low frequency projector 100 into an array of projectors as shown in FIG. 6. In this embodiment six projectors 100 are shown spaced a half-wavelength ($\lambda/2$) apart increasing the horizontal directivity. As an example, designing for a frequency of 800 Hz, the spacing between the projectors would be 1.875 meters. The tether 114 connects the line array to some deployment vessel such as a sonobuoy or ship. A control package 116 is used to provide beam forming control systems to increase the directivity and power of the signal. A box at the end of the line array 118 may house a weight or batteries (in the case of a sonobuoy) to ensure proper orientation of the line array underwater. The number of projectors may be varied and is determined by power and space requirements.

The projector 100 may also be used in a simulator such as that described in U.S. Pat. No. 6,075,753 issued to Clark et al., which is hereby incorporated by reference, to permit study of the extreme low frequency ranges below 1 kHz. Another possible use is to incorporate the low frequency projector into an array with other frequency projectors, such as mid and high range projectors, to cover a broad spectrum.

What has been described is only a few of many possible variations on the same invention and is not intended in a limiting sense. The claimed invention can be practiced using other variations not specifically described above.

What is claimed is:

1. A low frequency underwater acoustic projector comprising:

a power source;

at least one switching circuit for controlling said power source;

a first encapsulated spiral wound wire contiguous with a second encapsulated spiral wound wire;

wherein said first encapsulated spiral wound wire and said second encapsulated spiral wound wire are flexibly attached to an annular ring positioned around the seam of said first and second encapsulated spiral wound wires; and said first and second encapsulated spiral wound wires are coupled to said power source through said switching circuit.

2. A low frequency underwater acoustic projector comprising:

a first encapsulated spiral wound wire having external leads, a second encapsulated spiral wound wire having external leads, said second encapsulated spiral wound wire juxtaposed with said first encapsulated spiral wound wire;

an annular ring positioned around the seam of said first and second spiral wound wires; and said first spiral wound wire is flexibly attached to said annular ring; and said second spiral wound wire is flexibly attached to said annular ring.

3. A low frequency underwater acoustic projector as in claim 2, wherein said annular ring is epoxy.

4. A low frequency underwater acoustic projector as in claim 3, wherein said first and second spiral wound wires are flexibly attached to said annular ring with silicon rubber.

5. A low frequency acoustic projector array comprising:
a control package,
a plurality of projection elements operatively connected to said control package, wherein each said projection element is defined by;
a first encapsulated spiral wound wire having leads;
a second encapsulated spiral wound wire having leads; and
means for flexibly joining in parallel orientation said first and second encapsulated spiral wound wires;
wherein said first encapsulated spiral wound wire and said second encapsulated spiral wound wire are electrically isolated from each other.

6. A low frequency acoustic projector array as in claim 5, wherein said means for flexibly joining said first and second spiral wound wires further comprises an annular ring positioned around the seam of said first and second encapsulated spiral wound wires; and said first encapsulated spiral wound wire is flexibly attached to said annular ring; and said second encapsulated spiral wound wire is flexibly attached to said annular ring.

7. A low frequency acoustic projector array as in claim 6, wherein said annular ring is epoxy.

8. A low frequency acoustic projector array as in claim 7, wherein said first and second spiral wound wires are flexibly attached to said annular ring with silicon rubber.

9. A low frequency acoustic projector system comprising:
signal generation means for supplying an electrical signal at a desired frequency;
means for amplifying said electrical signal;
switching means for controlling said electrical signal;
at least one projector comprised of a first encapsulated spiral wound wire flexibly joined and contiguous with a second encapsulated spiral wound wire responsive to said electrical signal.

10. A low frequency acoustic projector system as in claim 9 wherein said projector means includes an array of projectors from which acoustical energy is emitted in a frequency band wherein said projectors provide acoustic energy at a selected frequency in the range of 10 Hz to 1 kHz.

11. A low frequency acoustic projector system as in claim 9 wherein said switching means transmits a transient electrical signal from said signal generation means to said projector.

12. A low frequency acoustic projector system as in claim 9 wherein said switching means transmits a steady state electrical signal from said signal generation means to said projector.

* * * * *